United States Patent
Yang (10) Patent No.: US 8,678,159 B2
(45) Date of Patent: Mar. 25, 2014

(54) COMPELLING-TYPE CENTRIFUGAL CLUTCH DEVICE WITH C-SHAPED JOINT STRUCTURE

(76) Inventor: Tai-Her Yang, Dzan-Hwa (TW)

( * ) Notice: Subject to any disclaimer, the term of this patent is extended or adjusted under 35 U.S.C. 154(b) by 398 days.

(21) Appl. No.: 13/008,090

(22) Filed: Jan. 18, 2011

(65) Prior Publication Data
US 2012/0181131 A1 Jul. 19, 2012

(51) Int. Cl.
F16D 43/16 (2006.01)
F16D 43/18 (2006.01)
F16D 43/21 (2006.01)
F16D 43/22 (2006.01)

(52) U.S. Cl.
USPC ............ 192/105 CD; 192/43.1; 192/52.5; 192/54.1; 192/71; 192/75

(58) Field of Classification Search
USPC ............ 192/52.5, 54.1, 105 CD, 105 CE
See application file for complete search history.

(56) References Cited

U.S. PATENT DOCUMENTS

| | | | | | |
|---|---|---|---|---|---|
| 2,463,100 | A | * | 3/1949 | Gredell | 192/105 CD |
| 3,190,402 | A | * | 6/1965 | Gubelmann | 188/185 |
| 3,329,245 | A | * | 7/1967 | Freber | 192/105 CD |
| 4,296,852 | A | * | 10/1981 | Luerken | 192/105 CD |
| 4,445,604 | A | * | 5/1984 | Rogers, Jr. | 192/105 CD |
| 8,177,018 | B2 | * | 5/2012 | Coleman et al. | 192/105 CD |

* cited by examiner

Primary Examiner — Rodney Bonck
(74) Attorney, Agent, or Firm — Bacon & Thomas, PLLC (57) ABSTRACT

A compelling-type centrifugal clutch device with C-shaped joint structure, in which a C-shaped joint structure assembly (100), which can be bended for displacement, is installed between an active rotary part (101) and a passive rotary part (201) of a centrifugal clutch device with a radial arrangement device and is driven by the active rotary part (101). A joint axial core of C-shaped joint structure (113) is also provided for connecting an active arm of C-shaped joint structure (111) and a centrifugal compelling arm of C-shaped joint structure (112) having a centrifugal force actuation clutch device (119) at one distal end, and a recovery spring (114) is installed between the mentioned two arms, so that an inward-bending prestressed force is formed between the two arms for performing the angular displacement through bending at difference angles.

17 Claims, 6 Drawing Sheets

COMPELLING-TYPE CENTRIFUGAL CLUTCH DEVICE WITH C-SHAPED JOINT STRUCTURE

BACKGROUND OF THE INVENTION (a) Field of the Invention

The present invention relates to a compelling-type centrifugal clutch device with C-shaped joint structure, in which a C-shaped joint structure assembly (100), which can be bended for displacement, is installed between an active rotary part (101) and a passive rotary part (201) of the centrifugal clutch device with a radial arrangement means and is driven by the active rotary part (101), a joint axial core of C-shaped joint structure (113) is provided for connecting an active arm of C-shaped joint structure (111) and a centrifugal compelling arm of C-shaped joint structure (112), a recovery spring (114) is installed between the mentioned two arms, so that an inward-bending prestressed force is formed between the two arms for performing the angular displacement through bending at difference angles, and the other end of the active arm of C-shaped joint structure (111) is connected and fastened on the active rotary part (101); and the distal end of the centrifugal compelling arm of C-shaped joint structure (112) is installed with a centrifugal force actuation clutch interface (119), when the rotation speed of the rotational driving performed by the active rotary part (101) reaches to a preset engagement rotation speed, the centrifugal force actuation clutch interface (119) is outwardly expanded and moved so as to be engaged in an inner annular clutch interface (120) of the passive rotary part (201), if the rotation direction of the rotary power source of the active rotary part (101) performs the rotational driving to the active rotary part (101) is opposite to the direction in which the C-shaped joint structure being bended and protruded, the C-shaped joint structure is compelled by a force applied through the active arm of C-shaped joint structure (111), so that the centrifugal force actuation clutch interface (119) of the centrifugal compelling arm of C-shaped joint structure (112) is further pressed and engaged at a compelling end surface of the inner annular clutch interface (120) of the passive rotary part (201) so as to drive the passive rotary part (201).

(b) Description of the Prior Art

A conventional centrifugal clutch device utilizes a friction plate of centrifugal force actuation clutch installed at an active side, so when the rotation speed at the active side reaches an engagement rotation speed, an engagement transmission is generated, however at this moment, the rotation speed is still low, so the centrifugal force applied to the friction plate of centrifugal force actuation clutch is not sufficient, thus a disadvantage of easily to slip is caused.

SUMMARY OF THE INVENTION

The present invention relates to a compelling-type centrifugal clutch device with C-shaped joint structure, in which a C-shaped joint structure assembly (100), which can be bended for displacement, is installed between an active rotary part (101) and a passive rotary part (201) of the centrifugal clutch device with a radial arrangement means and is driven by the active rotary part (101), a joint axial core of C-shaped joint structure (113) is provided for connecting an active arm of C-shaped joint structure (111) and a centrifugal compelling arm of C-shaped joint structure (112), a recovery spring (114) is installed between the mentioned two arms, so that an inward-bending prestressed force is formed between the two arms for performing the angular displacement through bending at difference angles, and the other end of the active arm of C-shaped joint structure (111) is connected and fastened on the active rotary part (101); and the distal end of the centrifugal compelling arm of C-shaped joint structure (112) is installed with a centrifugal force actuation clutch interface (119), when the rotation speed of the rotational driving performed by the active rotary part (101) reaches to a preset engagement rotation speed, the centrifugal force actuation clutch interface (119) is outwardly expanded and moved so as to be engaged in an inner annular clutch interface (120) of the passive rotary part (201), and has following performances including:

1. The active rotary part (101) performs the rotational driving in the direction opposite to the direction in which the C-shaped joint structure being bended and protruded, and the rotation speed of the active rotary part (101) is higher than the set engagement rotation speed of the centrifugal force actuation clutch interface (119) at the distal end of the centrifugal compelling arm of C-shaped joint structure (112), so that when the centrifugal force actuation clutch interface (119) is engaged in the inner annular clutch interface (120), and when the rotation speed is higher than the passive rotary part (201), the active rotary part (101) drives the passive rotary part (201);

2. The passive rotary part (201) performs the rotational driving in the direction opposite to the direction in which the C-shaped joint structure being bended and protruded, and if the active rotary part (101) does not input the rotational kinetic energy, the passive rotary part (201) is in an idle sliding rotation state relative to the active rotary part (101) thereby does not link the active rotary part (101), and if the centrifugal force actuation clutch interface (119) at the distal end of the centrifugal compelling arm of C-shaped joint structure (112) is engaged in the inner annular clutch interface (120) because the active rotary part (101) inputs the rotational kinetic energy for raising the rotation speed, then only an engagement linking force generated by the centrifugal force is formed between the passive rotary part (201) and the active rotary part (101);

3. The passive rotary part (201) performs the rotational driving in the direction the same as the direction in which the C-shaped joint structure being bended and protruded, if the active rotary part (101) does not input the rotational kinetic energy, or the rotation speed is lower than the engagement rotation speed of the centrifugal force actuation clutch interface (119) of the centrifugal compelling arm of C-shaped joint structure (112), the passive rotary part (201) is in an idle sliding rotation state so the active rotary part (101) is not driven; if the rotation speed of the active rotary part (101) is raised so that the centrifugal force actuation clutch interface (119) at the distal end of the centrifugal compelling arm of C-shaped joint structure (112) is engaged in the inner annular clutch interface (120), the passive rotary part (201) drives the active rotary part (101);

4. The active rotary part (101) performs the rotational driving in the direction the same as the direction in which the C-shaped joint structure being bended and protruded, and the passive rotary part (201) is in an idle sliding rotation state for not being linked with the active rotary part (101), if the rotation speed of the active rotary part (101) is raised, and the centrifugal force actuation clutch interface (119) at the distal end of the centrifugal compelling arm of C-shaped joint structure (112) is engaged in the inner annular clutch interface (120), then only an engagement linking force generated by the centrifugal force is formed between the passive rotary part (201) and the active rotary part (101);

DESCRIPTION OF MAIN COMPONENT SYMBOLS

100: C-shaped joint structure assembly
101: Active rotary part
111: Active arm of C-shaped joint structure
112: Centrifugal compelling arm of C-shaped joint structure
113: Joint axial core of C-shaped joint structure
114: Recovery spring
115: Pulling force recovery spring
116: Restrain pin
117: Friction type clutch interface
118: Tooth-shaped clutch interface
119: Centrifugal force actuation clutch interface
120: Inner annular clutch interface
121: Friction type inner annular clutch interface
122: Tooth-shaped inner annular clutch interface
123: Compelling-to-release inclined tooth-shaped clutch interface
124: Compelling-to-release inclined tooth-shaped inner annular clutch interface
201: Passive rotary part

DETAILED DESCRIPTION OF THE PREFERRED EMBODIMENTS

A conventional centrifugal clutch device utilizes a friction plate of centrifugal force actuation clutch installed at an active side, so when the rotation speed at the active side reaches an engagement rotation speed, an engagement transmission is generated, however at this moment, the rotation speed is still low, so the centrifugal force applied to the friction plate of centrifugal force actuation clutch is not sufficient, thus a disadvantage of easily to slip is caused.

The present invention relates to a compelling-type centrifugal clutch device with C-shaped joint structure, in which a C-shaped joint structure assembly (100), which can be bended for displacement, is installed between an active rotary part (101) and a passive rotary part (201) of the centrifugal clutch device with a radial arrangement means and is driven by the active rotary part (101), a joint axial core of C-shaped joint structure (113) is provided for connecting an active arm of C-shaped joint structure (111) and a centrifugal compelling arm of C-shaped joint structure (112), a recovery spring (114) is installed between the mentioned two arms, so that an inward-bending prestressed force is formed between the two arms for performing the angular displacement through bending at difference angles, and the other end of the active arm of C-shaped joint structure (111) is connected and fastened on the active rotary part (101); and the distal end of the centrifugal compelling arm of C-shaped joint structure (112) is installed with a centrifugal force actuation clutch interface (119), when the rotation speed of the rotational driving performed by the active rotary part (101) reaches to a preset engagement rotation speed, the centrifugal force actuation clutch interface (119) is outwardly expanded and moved so as to be engaged in an inner annular clutch interface (120) of the passive rotary part (201), if the rotation direction of the rotary power source of the active rotary part (101) performs the rotational driving to the active rotary part (101) is opposite to the direction in which the C-shaped joint structure being bended and protruded, the C-shaped joint structure is compelled by a force applied through the active arm of C-shaped joint structure (111), so that the centrifugal force actuation clutch interface (119) of the centrifugal compelling arm of C-shaped joint structure (112) is further pressed and engaged at a compelling end surface of the inner annular clutch interface (120) of the passive rotary part (201) so as to drive the passive rotary part (201).

Figure 1:
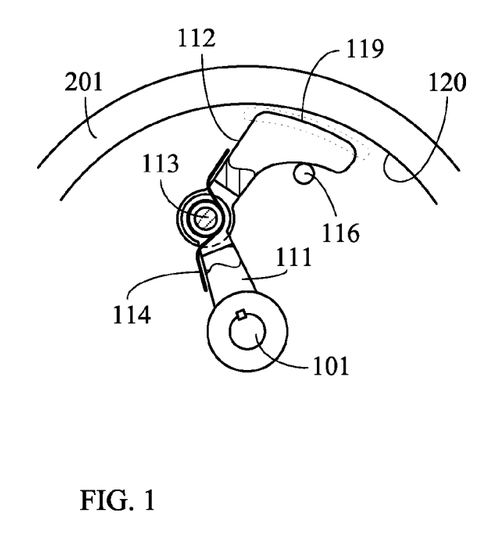
FIG. 1 is a schematic view showing the fundamental theory structure according to the present invention.

The present invention relates to a compelling-type centrifugal clutch device with C-shaped joint structure, in which a C-shaped joint structure assembly (100), which can be bended for displacement, is installed between an active rotary part (101) and a passive rotary part (201) of the centrifugal clutch device with a radial arrangement means and is driven by the active rotary part (101), a joint axial core of C-shaped joint structure (113) is provided for connecting an active arm of C-shaped joint structure (111) and a centrifugal compelling arm of C-shaped joint structure (112), a recovery spring (114) is installed between the mentioned two arms, so that an inward-bending prestressed force is formed between the two arms for performing the angular displacement through bending at difference angles, and the other end of the active arm of C-shaped joint structure (111) is connected and fastened on the active rotary part (101); and the distal end of the centrifugal compelling arm of C-shaped joint structure (112) is installed with a centrifugal force actuation clutch interface (119), when the rotation speed of the rotational driving performed by the active rotary part (101) reaches to a preset engagement rotation speed, the centrifugal force actuation clutch interface (119) is outwardly expanded and moved so as to be engaged in an inner annular clutch interface (120) of the passive rotary part (201), and has following performances including:

1. The active rotary part (101) performs the rotational driving in the direction opposite to the direction in which the C-shaped joint structure being bended and protruded, and the rotation speed of the active rotary part (101) is higher than the set engagement rotation speed of the centrifugal force actuation clutch interface (119) at the distal end of the centrifugal compelling arm of C-shaped joint structure (112), so that when the centrifugal force actuation clutch interface (119) is engaged in the inner annular clutch interface (120), and when the rotation speed is higher than the passive rotary part (201), the active rotary part (101) drives the passive rotary part (201);
2. The passive rotary part (201) performs the rotational driving in the direction opposite to the direction in which the C-shaped joint structure being bended and protruded, and if the active rotary part (101) does not input the rotational kinetic energy, the passive rotary part (201) is in an idle sliding rotation state relative to the active rotary part (101) thereby does not link the active rotary part (101), and if the centrifugal force actuation clutch interface (119) at the distal end of the centrifugal compelling arm of C-shaped joint structure (112) is engaged in the inner annular clutch interface (120) because the active rotary part (101) inputs the rotational kinetic energy for raising the rotation speed, then only an engagement linking force generated by the centrifugal force is formed between the passive rotary part (201) and the active rotary part (101);
3. The passive rotary part (201) performs the rotational driving in the direction the same as the direction in which the C-shaped joint structure being bended and protruded, if the active rotary part (101) does not input the rotational kinetic energy, or the rotation speed is lower than the engagement rotation speed of the centrifugal force actuation clutch interface (119) of the centrifugal compelling arm of C-shaped joint structure (112), the passive rotary part (201) is in an idle sliding rotation state so the active rotary part (101) is not driven; if the rotation speed of the active rotary part (101) is raised so that the centrifugal force actuation clutch interface (119) at the distal end of the centrifugal compelling arm of C-shaped joint structure (112) is engaged in the inner annular clutch interface (120), the passive rotary part (201) drives the active rotary part (101);
4. The active rotary part (101) performs the rotational driving in the direction the same as the direction in which the C-shaped joint structure being bended and protruded, and the passive rotary part (201) is in an idle sliding rotation state for not being linked with the active rotary part (101), if the rotation speed of the active rotary part (101) is raised, and the centrifugal force actuation clutch interface (119) at the distal end of the centrifugal compelling arm of C-shaped joint structure (112) is engaged in the inner annular clutch interface (120), then only an engagement linking force generated by the centrifugal force is formed between the passive rotary part (201) and the active rotary part (101);

FIG. 1 is a schematic view showing the fundamental principle structure according to the present invention.

Figure 2:
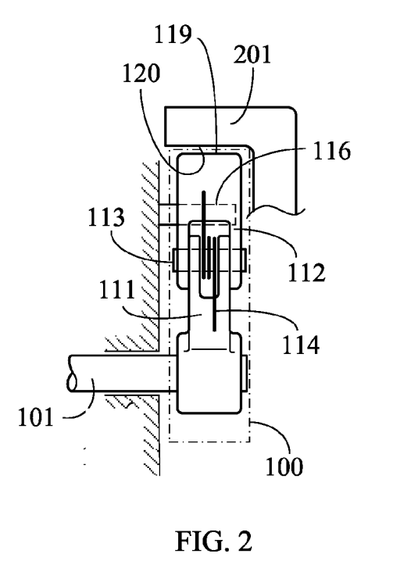
FIG. 2 is a lateral view showing the fundamental theory structure according to the present invention.

FIG. 2 is a lateral view showing the fundamental principle structure according to the present invention.

As shown in FIG. 1 and FIG. 2, it mainly consists of:

Active rotary part (101): serving to input the active rotational kinetic energy, one end of the active arm of C-shaped joint structure (111) is connected and fastened on the active rotary part (101), the other end of the active arm of C-shaped joint structure (111) is coupled to the centrifugal compelling arm of C-shaped joint structure (112) through the bendable C-shaped joint structure (100) installed therebetween, and installed with a joint axial core of C-shaped joint structure (113), a recovery spring (114) is installed between the active arm of C-shaped joint structure (111) and the centrifugal compelling arm of C-shaped joint structure (112), so that an inward bending prestressed force is formed between the active arm of C-shaped joint structure (111) and the centrifugal compelling arm of C-shaped joint structure (112) for performing the angle displacement through bending at difference angles, and the position of the inward bending displacement of the centrifugal compelling arm of C-shaped joint structure (112) is restrained by a restrain pin (116) installed at the active rotary part (101);

Passive rotary part (201): which is a rotation structure for outputting the rotational kinetic energy, and installed with a transmission part formed in an annular structure, an inner annular clutch interface (120) is inwardly formed on the annular structure, for performing operations of engaging/releasing with the centrifugal force actuation clutch interface (119);

Centrifugal compelling arm of C-shaped joint structure (112) having a centrifugal force actuation clutch interface (119) at the distal end, which is served to continuously receive the rotational kinetic energy of the active rotary part (101) and be forced to move, so that when the rotation speed of the rotational kinetic energy of the active rotary part (101) is raised to enable the centrifugal force actuation clutch interface (119) to be engaged in the inner annular clutch interface (120), a pressed compelling engagement state is formed between the centrifugal force actuation clutch interface (119) and the inner annular clutch interface (120) of the passive rotary part (201).

Figure 3:
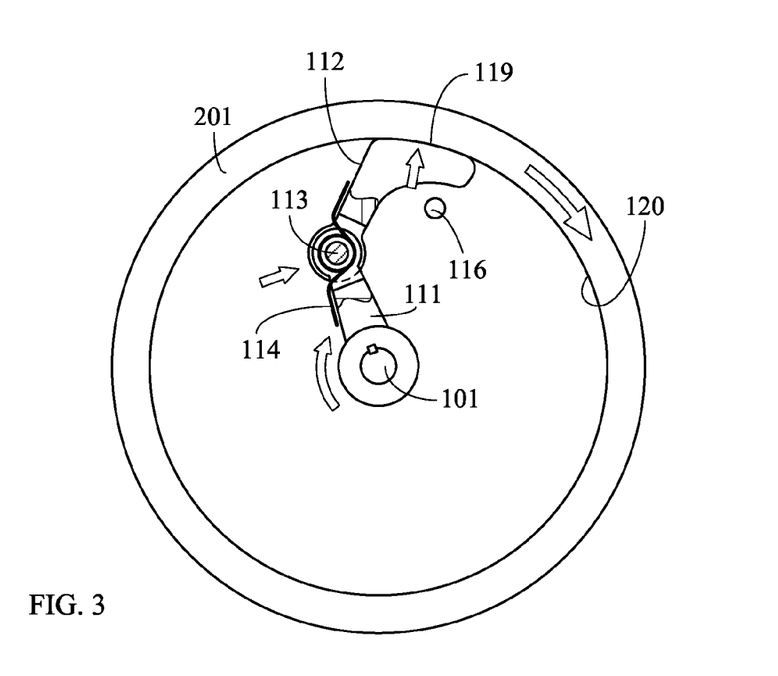
FIG. 3 is a schematic view showing the operation of the active rotary part (101) performing rotational driving in the direction opposite to the direction in which the C-shaped joint structure assembly (100) being bended and protruded so as to drive the passive rotary part (201).

The operation functions of the compelling-type centrifugal clutch device with C-shaped joint structure according to the present invention are as followings:

FIG. 3 is a schematic view showing the operation of the active rotary part (101) performing rotational driving in the direction opposite to the direction in which the C-shaped joint structure assembly (100) being bended and protruded so as to drive the passive rotary part (201).

As shown in FIG. 3, in the compelling-type centrifugal clutch device with C-shaped joint structure shown in FIG. 1, when the active rotary part (101) performs the driving in the direction opposite to the direction in which the C-shaped joint structure assembly (100) being bended and protruded (the clockwise direction), and the rotation speed thereof is raised to enable the centrifugal force actuation clutch interface (119) at the distal end of the centrifugal compelling arm of C-shaped joint structure (112) to be engaged in the inner annular clutch interface (120), the rotation torque thereof generates a compelling motion to the centrifugal compelling arm of C-shaped joint structure (112) through the bendable C-shaped joint structure (100), so a clockwise compelling force is generated to the passive rotary part (201), and the bending angle of the bendable C-shaped joint structure (100) is in a state to ensure, while the mentioned clockwise compelling force being generated, the outward expanding force generated by the centrifugal compelling arm of C-shaped joint structure (112) to the centrifugal force actuation clutch interface (119) at the distal end thereof is sufficient enough for allowing the centrifugal force actuation clutch interface (119) to be pressed and engaged in the inner annular clutch interface (120), thereby to drive the passive rotary part (201) by the active rotary part (101) to clockwise rotate.

Figure 4:
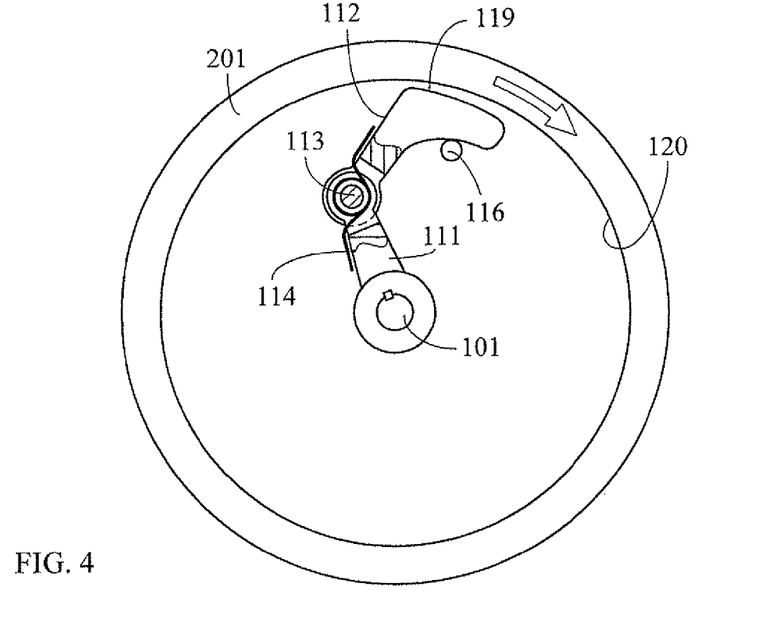
FIG. 4 is a schematic view showing the operation of the passive rotary part (201) driving the active rotary part (101) in the direction (the clockwise direction) opposite to the direction in which the C-shaped joint structure assembly (100) being bended and protruded, so as to form an idle sliding rotation relative to the active rotary part, according to the present invention.

According to the present invention, the compelling-type centrifugal clutch device with C-shaped joint structure further includes the passive rotary part (201) operates the active rotary part (101) in the direction opposite to the direction in which the C-shaped joint structure being bended and protruded, so that an idle rotation state is formed between the active rotary part (101) and the passive rotary part (201), or only an engagement linking force generated by the centrifugal force is formed between the passive rotary part (201) and the active rotary part (101);

FIG. 4 is a schematic view showing the operation of the passive rotary part (201) driving the active rotary part (101) in the direction opposite to the direction in which the C-shaped joint structure assembly (100) being bended and protruded (the clockwise direction), so as to form an idle sliding rotation relative to the active rotary part, according to the present invention.

As shown in FIG. 4, in the compelling-type centrifugal clutch device with C-shaped joint structure shown in FIG. 1, when the passive rotary part (201) drives the active rotary part (101) in the direction opposite to the direction in which the C-shaped joint structure assembly (100) being bended and protruded, and the active rotary part (101) does not input the rotational kinetic energy, the passive rotary part (201) is in an idle sliding rotation state relative to the active rotary part (101) for not being linked with the active rotary part (101), if the rotation speed of the rotational kinetic energy input by the active rotary part (101) is raised for enabling the centrifugal force actuation clutch interface (119) at the distal end of the centrifugal compelling arm of C-shaped joint structure (112) to be engaged in the inner annular clutch interface (120), only an engagement linking force generated by the centrifugal force is formed between the passive rotary part (201) and the active rotary part (101).

Figure 5:
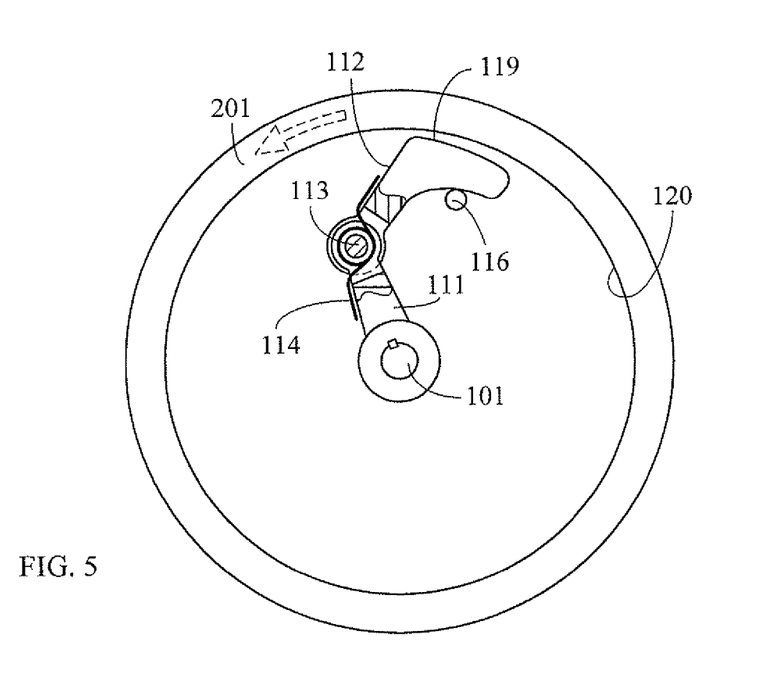
FIG. 5 is a schematic view showing the operation of the passive rotary part (201) performing the rotational driving in the direction (the counterclockwise direction) the same as the direction in which the C-shaped joint structure assembly (100) being bended and protruded, and the active rotary part (101) does not input the rotational kinetic energy, so as to form an idle sliding rotation relative to the active rotary part, according to the present invention.

According to the present invention, the compelling-type centrifugal clutch device with C-shaped joint structure further includes the passive rotary part (201) drives the active rotary part (101) in the direction the same as the direction in which the C-shaped joint structure being bended and protruded, and when the active rotary part (101) does not input the rotational kinetic energy, an idle rotation state is formed between the active rotary part (101) and the passive rotary part (201), or only an engagement linking force generated by the centrifugal force is formed between the passive rotary part (201) and the active rotary part (101);

FIG. 5 is a schematic view showing the operation of the passive rotary part (201) performing the rotational driving in the direction (the counterclockwise direction) the same as the direction in which the C-shaped joint structure assembly (100) being bended and protruded, and when the active rotary part (101) does not input the rotational kinetic energy, as the passive rotary part (201) forms an idle sliding rotation relative to the active rotary part, according to the present invention.

As shown in FIG. 5, in the compelling-type centrifugal clutch device with C-shaped joint structure shown in FIG. 1, when the active rotary part (101) does not input the rotational kinetic energy, the passive rotary part (201) performs the rotational driving in the direction the same as the direction in which the C-shaped joint structure assembly (100) being bended and protruded (the counterclockwise direction), the passive rotary part (201) is in an idle sliding rotation state so the active rotary part (101) is not driven, and if the rotation speed of the active rotary part (101) is raised for enabling the centrifugal force actuation clutch interface (119) at the distal end of the centrifugal compelling arm of C-shaped joint structure (112) to be engaged in the inner annular clutch interface (120), then the passive rotary part (201) drives the active rotary part (101).

Figure 6:
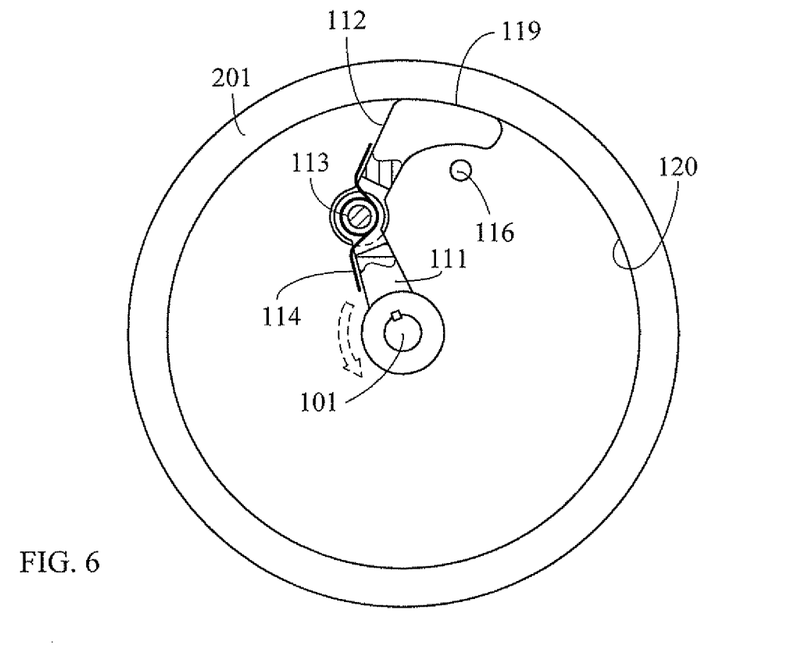
FIG. 6 is a schematic view showing the operation of the active rotary part (101) performing the rotational driving in the direction (the counterclockwise direction) the same as the direction in which the C-shaped joint structure assembly (100) being bended and protruded, and being in an idle sliding rotation state relative to the passive rotary part (201).

According to the present invention of the compelling-type centrifugal clutch device with C-shaped joint structure, when the active rotary part (101) drives the passive rotary part (201) in the direction the same as the direction in which the C-shaped joint structure being bended and protruded (the counterclockwise direction), the active rotary part (101) is in an idle rotation state relative to the passive rotary part (201), or only an engagement linking force generated by the centrifugal force is formed between the passive rotary part (201) and the active rotary part (101);

FIG. 6 is a schematic view showing the operation of the active rotary part (101) performing the rotational driving in the direction (the counterclockwise direction) the same as the direction in which the C-shaped joint structure assembly (100) being bended and protruded, and being in an idle sliding rotation state relative to the passive rotary part (201).

As shown in FIG. 6, when the active rotary part (101) drives the passive rotary part (201) in the direction the same as the direction in which the C-shaped joint structure assembly (100) being bended and protruded, the passive rotary part (201) is in an idle sliding rotation state for not being linked with the active rotary part (101), and if the rotation speed of the active rotary part (101) is raised for enabling the centrifugal force actuation clutch interface (119) at the distal end of the centrifugal compelling arm of C-shaped joint structure (112) to be engaged in the inner annular clutch interface (120), only an engagement linking force generated by the centrifugal force is formed between the active rotary part (101) and the passive rotary part (201);

According to the present invention of the compelling-type centrifugal clutch device with C-shaped joint structure, for enhancing the transmission stability and increasing the transmission torque in actual use, two or more than two of C-shaped joint structure assemblies (100) having the same joint bending and protruding direction can be installed between the active rotary part (101) and the passive rotary part (201), so as to synchronously interact with the passive rotary part (201).

Figure 7:
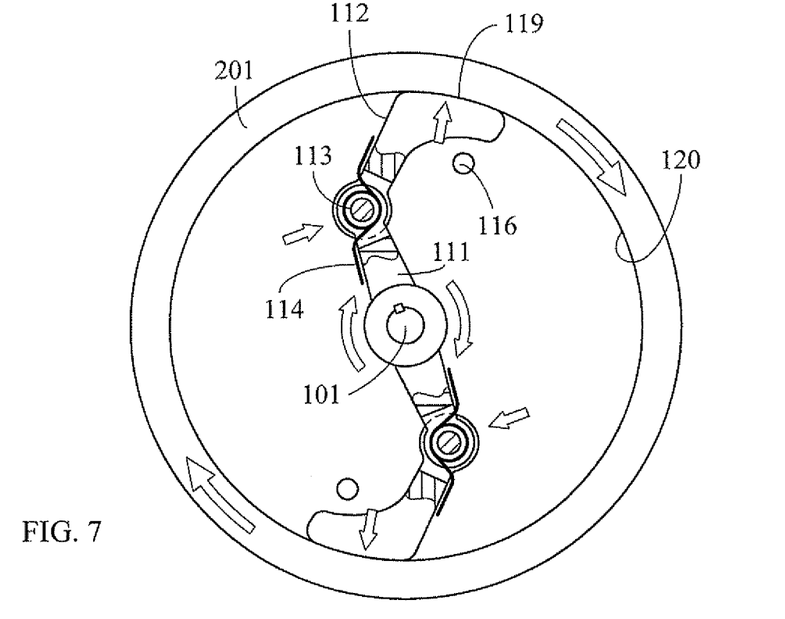
FIG. 7 is a schematic structural view showing the compelling-type centrifugal clutch device with C-shaped joint structure in which two C-shaped joint structure assemblies (100) having the same bending and protruding direction relative to the passive rotary part (201) being installed between the active rotary part (101) and the passive rotary part (201), according to one embodiment of the present invention.

FIG. 7 is a schematic structural view showing the compelling-type centrifugal clutch device with C-shaped joint structure in which two C-shaped joint structure assemblies (100) having the same bending and protruding direction relative to the passive rotary part (201) being installed between the active rotary part (101) and the passive rotary part (201), according to one embodiment of the present invention.

As shown in FIG. 7, a first C-shaped joint structure assembly (100) and a second C-shaped joint structure assembly (100) are installed between the active rotary part (101) and the passive rotary part (201) in a radial arrangement, the joint structures of the first C-shaped joint structure assembly (100) and the second C-shaped joint structure assembly (100) are bended and protruded in the same direction, so as to operate between the active rotary part (101) and the passive rotary part (201), and the operation function is the same as is the embodiment of FIG. 1.

Figure 8:
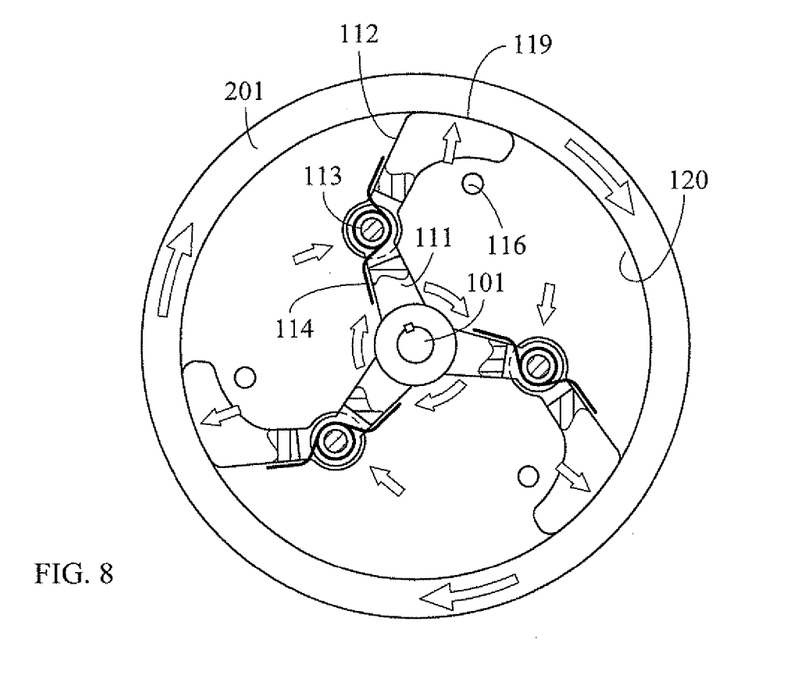
FIG. 8 is a schematic structural view showing the compelling-type centrifugal clutch device with C-shaped joint structure in which three C-shaped joint structure assemblies (100) having the same driving direction relative to the passive rotary part (201) being installed between the active rotary part (101) and the passive rotary part (201), according to one embodiment of the present invention.

FIG. 8 is a schematic structural view showing the compelling-type centrifugal clutch device with C-shaped joint structure in which three C-shaped joint structure assemblies (100) having the same driving direction relative to the passive rotary part (201) being installed between the active rotary part (101) and the passive rotary part (201), according to one embodiment of the present invention.

As shown in FIG. 8, a first C-shaped joint structure assembly (100), a second C-shaped joint structure assembly (100) and a third C-shaped joint structure assembly (100) are installed between the active rotary part (101) and the passive rotary part (201) in a radial arrangement, the joint structures of the first C-shaped joint structure assembly (100), the second C-shaped joint structure assembly (100) and the third C-shaped joint structure assembly (100) are bended and protruded in the same direction, so as to operate between the active rotary part (101) and the passive rotary part (201), and the operation function is the same as in the embodiment of FIG. 1.

Figure 9:
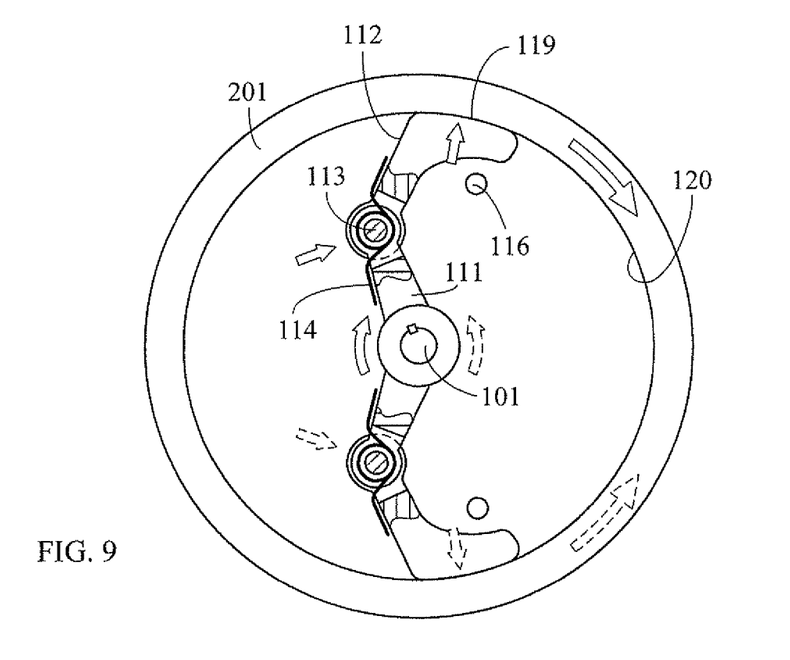
FIG. 9 is a schematic structural view showing the present invention being installed with a C-shaped joint structure assembly (100) clockwise bended and a C-shaped joint structure assembly (100) counterclockwise bended.

FIG. 9 is a schematic structural view showing the present invention being installed with a C-shaped joint structure assembly (100) clockwise bended and a C-shaped joint structure assembly (100) counterclockwise bended.

As shown in FIG. 9, a first C-shaped joint structure assembly (100) and a second C-shaped joint structure assembly (100) are installed between the active rotary part (101) and the passive rotary part (201) in a radial arrangement, and the joint structures of the first C-shaped joint structure assembly (100) and the second C-shaped joint structure assembly (100) are bended and protruded in different directions, so as to operate between the active rotary part (101) and the passive rotary part (201).

Figure 10:
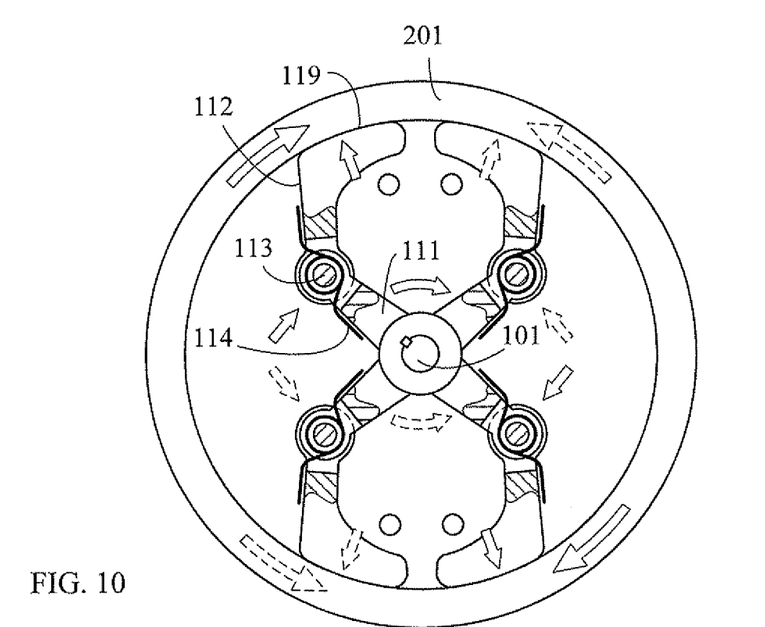
FIG. 10 is a schematic structural view showing the present invention being installed with two C-shaped joint structure assemblies (100) clockwise bended and two C-shaped joint structure assemblies (100) counterclockwise bended.

FIG. 10 is a schematic structural view showing the present invention being installed with two C-shaped joint structure assemblies (100) clockwise bended and two C-shaped joint structure assemblies (100) counterclockwise bended.

As shown in FIG. 10, a first C-shaped joint structure assembly (100), a second C-shaped joint structure assembly (100), a third C-shaped joint structure assembly (100) and a fourth C-shaped joint structure assembly (100) are installed between the active rotary part (101) and the passive rotary part (201) in circle sequence arranged in a radial arrangement, wherein the joint structures of the first C-shaped joint structure assembly (100) and the third C-shaped joint structure assembly (100) are clockwise bended, and the second C-shaped joint structure assembly (100) and the fourth C-shaped joint structure assembly (100) are counterclockwise bended.

Figure 11:
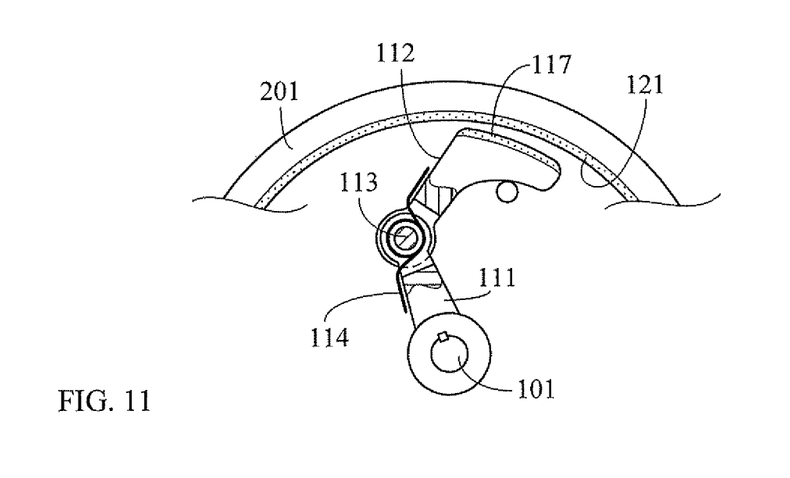
FIG. 11 is a schematic view showing one embodiment of the present invention being installed with a friction type clutch interface (117) and a friction type inner annular clutch interface (121).

According to the present invention of the compelling-type centrifugal clutch device with C-shaped joint structure, the structural state of the centrifugal force actuation clutch interface (119) at the distal end of the centrifugal compelling arm of C-shaped joint structure (112) installed in the C-shaped joint structure assembly (100) includes a friction type clutch interface (117) or a tooth-shaped clutch interface (118) or a compelling-to-release inclined tooth-shaped clutch interface (123), and the structural state of the inner annular clutch interface (120) is selected from the friction type inner annular clutch interface (121) and the tooth-shaped inner annular clutch interface (122) and the compelling-to-release inclined tooth-shaped inner annular clutch interface (124) for mating with the structural state of the centrifugal force actuation clutch interface (119);

FIG. 11 is a schematic view showing one embodiment of the present invention being installed with a friction type clutch interface (117) and a friction type inner annular clutch interface (121).

As shown in FIG. 11, the centrifugal force actuation clutch interface (119) at the distal end of the centrifugal compelling arm of C-shaped joint structure (112) of the C-shaped joint structure assembly (100) installed between the active rotary part (101) and the passive rotary part (201) is constituted by a friction type clutch interface (117), and the inner annular clutch interface (120) installed at the passive rotary part (201) for being coupled with the friction type clutch interface (117) is constituted by a friction type inner annular clutch interface (121), for performing operations of engaging/releasing with the friction type clutch interface (117).

Figure 12:
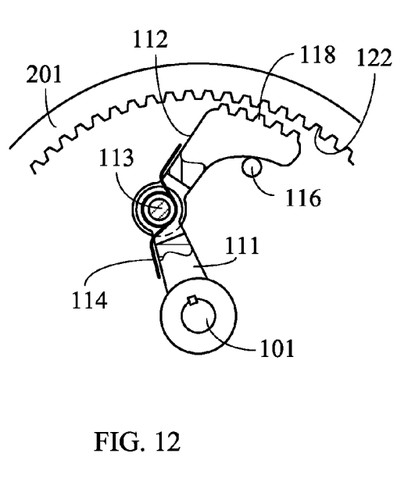
FIG. 12 is a schematic view showing one embodiment of the present invention being installed with a tooth-shaped clutch interface (118) and a tooth-shaped inner annular clutch interface (122).

FIG. 12 is a schematic view showing one embodiment of the present invention being installed with a tooth-shaped clutch interface (118) and a tooth-shaped inner annular clutch interface (122).

As shown in FIG. 12, the centrifugal force actuation clutch interface (119) at the distal end of the centrifugal compelling arm of C-shaped joint structure (112) of the C-shaped joint structure assembly (100) installed between the active rotary part (101) and the passive rotary part (201) is constituted by a tooth-shaped clutch interface (118), and the inner annular clutch interface (120) installed in the passive rotary part (201) for being coupled with the tooth-shaped clutch interface (118) is constituted by a tooth-shaped inner annular clutch interface (122), for performing operations of engaging/releasing with the tooth-shaped clutch interface (118).

Figure 13:
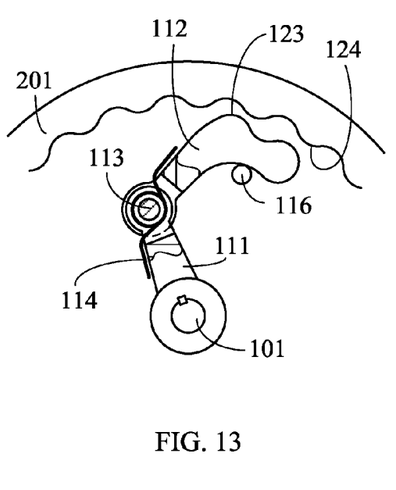
FIG. 13 is a schematic view showing one embodiment of the present invention being installed with a compelling-to-release inclined tooth-shaped clutch interface (123) and a compelling-to-release inclined tooth-shaped inner annular clutch interface (124).

FIG. 13 is a schematic view showing one embodiment of the present invention being installed with a compelling-to-release inclined tooth-shaped clutch interface (123) and a compelling-to-release inclined tooth-shaped inner annular clutch interface (124).

As shown in FIG. 13, the centrifugal force actuation clutch interface (119) at the distal end of the centrifugal compelling arm of C-shaped joint structure (112) of the C-shaped joint structure assembly (100) installed between the active rotary part (101) and the passive rotary part (201) is constituted by a compelling-to-release inclined tooth-shaped clutch interface (123), and the inner annular clutch interface (120) installed in the passive rotary part (201) for being coupled with the compelling-to-release inclined tooth-shaped inner annular clutch interface (124) is constituted by the tooth-shaped inner annular clutch interface (122) for performing operations of engaging/releasing with the tooth-shaped clutch interface (118); if the friction force is not concerned, when the compelling-to-release force formed between the inclined tooth surfaces of the compelling-to-release inclined tooth-shaped clutch interface (123) and the compelling-to-release inclined tooth-shaped inner annular clutch interface (124) by the enlarging transmission torque is greater that the vector sum of the centrifugal force of the centrifugal force actuation clutch interface (119) and the compelling force of the centrifugal compelling arm of C-shaped joint structure (112), the compelling-to-release inclined tooth-shaped clutch interface (123) and the compelling-to-release inclined tooth-shaped inner annular clutch interface (124) are forced to be released and a sliding state is formed between the above two.

According to the present invention of the compelling-type centrifugal clutch device with C-shaped joint structure, the recovery spring (114) can be replaced by a pulling force recovery spring (115) without altering the original function, so the application can be more flexible.

Figure 14:
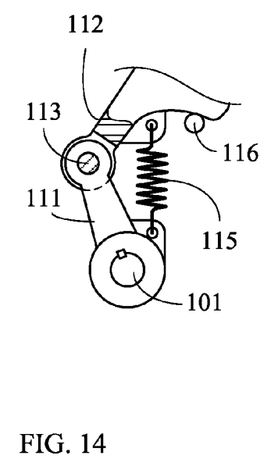
FIG. 14 is a schematic structural view showing the pulling force recovery spring (115) according to the present invention.

FIG. 14 is a schematic structural view showing the pulling force recovery spring (115) according to the present invention.

Figure 15:
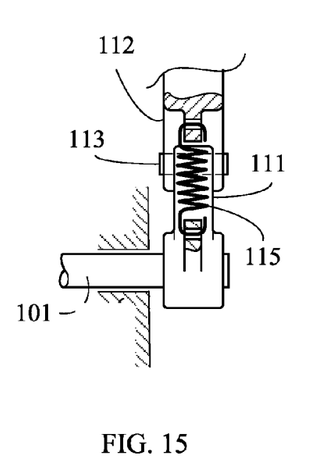
FIG. 15 is a bottom view of FIG. 14.

FIG. 15 is a bottom view of FIG. 14.

As shown in FIG. 14 and FIG. 15, the recovery spring (114) installed in the C-shaped joint structure assembly (100) for forming a prestressed inward bending force between the active arm of C-shaped joint structure (111) and the centrifugal compelling arm of C-shaped joint structure (112) is replaced by a pulling force recovery spring (115), and the pulling force recovery spring (115) is disposed between the active arm of C-shaped joint structure (111) and the centrifugal compelling arm of C-shaped joint structure (112), so that a prestressed inward bending force is form between the active arm of C-shaped joint structure (111) and the centrifugal compelling arm of C-shaped joint structure (112).

The invention claimed is:

1. A centrifugal clutch device comprising:
   an active rotary part (101) configured to be rotated by a power source;
   a passive rotary part (201) configured to output rotational energy having an inner annular clutch interface (120), said inner annular clutch interface (120) configured to engage and release with a centrifugal force actuation clutch interface (119);
   at least one C-shaped joint structure assembly (100) configured to be bent by displacement forces, said C-shaped joint structure assembly (100) comprising a radial arrangement installed between the active rotary part (101) and the passive rotary part (201) of the centrifugal clutch device,
   wherein said C-shaped joint structure assembly (100) is configured to be driven by the active rotary part, said C-shaped joint structure assembly (100) comprising a joint axial core (113) of the C-shaped joint structure configured to connect a first end of an active arm (111) of the C-shaped joint structure and a first end of a centrifugal compelling arm (112) of the C-shaped joint structure, and a recovery spring (114) installed between the active arm and the centrifugal compelling arm adjacent the joint axial core (113) near the first end of the centrifugal compelling arm (112) and first end of the active arm (111) so that an inward-bending pre-stressed force is created between the active arm and the centrifugal compelling arm,
   wherein a second end of the active arm (111) of the C-shaped joint structure is connected and fastened on the active rotary part (101), and a distal second end of the centrifugal compelling arm (112) of the C-shaped joint structure is coupled with the centrifugal force actuation clutch interface (119), and
   wherein said C-shaped joint structure is configured so that when a rotation speed of the active rotary part (101) reaches a preset engagement rotation speed, the centrifugal force actuation clutch interface (119) is outwardly expanded and moved so as to be engaged with the inner annular clutch interface (120) of the passive rotary part (201) so that the passive rotary part (201) outputs the rotational energy.

2. The centrifugal clutch device according to claim 1, wherein the clutch device is configured so that if a rotation direction of the rotary power source of the active rotary part (101) used for the rotational driving of the active rotary part (101) is in a second opposite direction to a first direction in which the C-shaped joint structure is being bent and protruded, the C-shaped joint structure is configured so that the active arm (111) of the C-shaped joint structure applies a further force so that the centrifugal force actuation clutch interface (119) of the centrifugal compelling arm (112) of the C-shaped joint structure is further pressed and engaged with the inner annular clutch interface (120) of the passive rotary part (201) so as to drive the passive rotary part (201).

3. The centrifugal clutch device according to claim 2, wherein the centrifugal clutch is configured so that when the active rotary part (101) is driven in a clockwise direction, and the rotation speed is raised to enable the centrifugal force actuation clutch interface (119) at the distal end of the centrifugal compelling arm (112) to be engaged with the inner annular clutch interface (120), the rotation torque generates a compelling motion to the centrifugal compelling arm (112) through the bendable C-shaped joint structure (100), so that a clockwise compelling force is generated to the passive rotary part (201), and the bendable C-shaped joint structure (100) has a bending angle configured so that the outward expanding force generated by the centrifugal compelling arm (112) to the centrifugal force actuation clutch interface (119) allows the centrifugal force actuation clutch interface (119) to be pressed and engaged in the inner annular clutch interface (120) to drive the passive rotary part (201) by the active rotary part (101) in a clockwise rotation,
   wherein the clockwise direction is in a direction opposite to the direction in which the C-shaped joint structure assembly (100) is bent and protruded.

4. The centrifugal clutch device according to claim 2, wherein the clutch device is configured so that when the passive rotary part (201) drives the active rotary part (101) in the direction opposite to the direction in which the C-shaped joint structure assembly (100) is bent and protruded, and the rotation speed of the active rotary part (101) does not exceed the preset engagement rotation speed to enable the centrifugal force actuation clutch interface (119) at the distal end of the centrifugal compelling arm (112) to be engaged with the inner annular clutch interface (120), the passive rotary part (201) is in an idle sliding rotation state relative to the active rotary part (101).

5. The centrifugal clutch device according to claim 2, wherein the clutch device is configured so that when the active rotary part (101) drives the passive rotary part (201) in the direction that is the same as the direction in which the C-shaped joint structure assembly (100) is bent and protruded, the passive rotary part (201) is in an idle sliding rotation state for not being linked with the active rotary part (101), and if the rotation speed of the active rotary part (101) is raised for enabling the centrifugal force actuation clutch interface (119) at the distal end of the centrifugal compelling arm (112) to be engaged in the inner annular clutch interface (120), only an engagement linking force generated by the centrifugal force is formed between the active rotary part (101) and the passive rotary part (201).

6. The centrifugal clutch device according to claim 2, wherein a first C-shaped joint structure assembly (100) and a second C-shaped joint structure assembly (100) are installed between the active rotary part (101) and the passive rotary part (201) in a radial arrangement, the joint structures of the first C-shaped joint structure assembly (100) and the second C-shaped joint structure assembly (100) being bent in the same direction so as to operate between the active rotary part (101) and the passive rotary part (201).

7. The centrifugal clutch device according to claim 2, wherein a first C-shaped joint structure assembly (100), a second C-shaped joint structure assembly (100) and a third C-shaped joint structure assembly (100) are installed between the active rotary part (101) and the passive rotary part (201) in a radial arrangement, the joint structures of the first C-shaped joint structure assembly (100), the second C-shaped joint structure assembly (100) and the third C-shaped joint structure assembly (100) being bent in the same direction so as to operate between the active rotary part (101) and the passive rotary part (201).

8. The centrifugal clutch device according to claim 2, wherein a first C-shaped joint structure assembly (100) and a second C-shaped joint structure assembly (100) are installed between the active rotary part (101) and the passive rotary part (201) in a radial arrangement, and the joint structures of the first C-shaped joint structure assembly (100) and the second C-shaped joint structure assembly (100) being bent in different directions so as to operate between the active rotary part (101) and the passive rotary part (201).

9. The centrifugal clutch device according to claim 2, wherein a first C-shaped joint structure assembly (100), a second C-shaped joint structure assembly (100), a third C-shaped joint structure assembly (100) and a fourth C-shaped joint structure assembly (100) are installed between the active rotary part (101) and the passive rotary part (201) in circle sequence arranged in a radial arrangement, wherein the joint structures of the first C-shaped joint structure assembly (100) and the third C-shaped joint structure assembly (100) are bent in the clockwise direction, and the second C-shaped joint structure assembly (100) and the fourth C-shaped joint structure assembly (100) are bent in a counterclockwise direction.

10. The centrifugal clutch device according to claim 2, wherein the centrifugal force actuation clutch interface (119) at the distal end of the centrifugal compelling arm (112) installed between the active rotary part (101) and the passive rotary part (201) comprises a friction type clutch interface (117), and the inner annular clutch interface (120) installed at the passive rotary part (201) for coupling with the friction type clutch interface (117) comprises a friction type inner annular clutch interface (121) for engaging and releasing with the friction type clutch interface (117).

11. The centrifugal clutch device according to claim 2, wherein the centrifugal force actuation clutch interface (119) at the distal end of the centrifugal compelling arm of C-shaped joint structure (112) installed between the active rotary part (101) and the passive rotary part (201) comprises a tooth-shaped clutch interface (118), and the inner annular clutch interface (120) installed in the passive rotary part (201) comprises a tooth-shaped inner annular clutch interface (122) configured to engage with the tooth-shaped clutch interface (118).

12. The centrifugal clutch device according to claim 2, wherein the centrifugal force actuation clutch interface (119) at the distal end of the centrifugal compelling arm of C-shaped joint structure (112) comprises a compelling-to-release inclined tooth-shaped clutch interface (123), and the inner annular clutch interface (120) installed in the passive rotary part (201) comprises an inclined tooth-shaped inner annular clutch interface (124) configured to engage and release with the tooth-shaped clutch interface (123); and wherein when a compelling-to-release force formed between the inclined tooth surfaces of the compelling-to-release inclined tooth-shaped clutch interface (123) and the compelling-to-release inclined tooth-shaped inner annular clutch interface (124) is greater that a vector sum of the centrifugal force of the centrifugal force actuation clutch interface (119) and the compelling force of the centrifugal compelling arm of C-shaped joint structure (112), the compelling-to-release inclined tooth-shaped clutch interface (123) and the compelling-to-release inclined tooth-shaped inner annular clutch interface (124) are forced to be released to form a sliding state between the tooth-shaped clutch interface (123) and the inner annular clutch interface (124).

13. The centrifugal clutch device according to claim 1, further comprising a retraining pin (116) installed at the active rotary part (101), said restraining pin being arranged in a way so that the inward bending displacement of the centrifugal compelling arm (112) of the C-shaped joint structure is restrained by the restraining pin (116).

14. The centrifugal clutch device according to claim 1, wherein the centrifugal force actuation clutch interface (119) at the distal end of the centrifugal compelling arm (112) installed between the active rotary part (101) and the passive rotary part (201) comprises a friction type clutch interface (117), and the inner annular clutch interface (120) installed at the passive rotary part (201) for coupling with the friction type clutch interface (117) comprises a friction type inner annular clutch interface (121) for engaging and releasing with the friction type clutch interface (117).

15. The centrifugal clutch device according to claim 1, wherein the centrifugal force actuation clutch interface (119) at the distal end of the centrifugal compelling arm of C-shaped joint structure (112) installed between the active rotary part (101) and the passive rotary part (201) comprises a tooth-shaped clutch interface (118), and the inner annular clutch interface (120) installed in the passive rotary part (201) comprises a tooth-shaped inner annular clutch interface (122) configured to engage with the tooth-shaped clutch interface (118).

16. The centrifugal clutch device according to claim 1, wherein the centrifugal force actuation clutch interface (119) at the distal end of the centrifugal compelling arm of C-shaped joint structure (112) comprises a compelling-to-release inclined tooth-shaped clutch interface (123), and the inner annular clutch interface (120) installed in the passive rotary part (201) comprises an inclined tooth-shaped inner annular clutch interface (124) configured to engage and release with the tooth-shaped clutch interface (123); and wherein when a compelling-to-release force formed between the inclined tooth surfaces of the compelling-to-release inclined tooth-shaped clutch interface (123) and the compelling-to-release inclined tooth-shaped inner annular clutch interface (124) is greater that a vector sum of the centrifugal force of the centrifugal force actuation clutch interface (119) and the compelling force of the centrifugal compelling arm of C-shaped joint structure (112), the compelling-to-release inclined tooth-shaped clutch interface (123) and the compelling-to-release inclined tooth-shaped inner annular clutch interface (124) are forced to be released to form a sliding state between the tooth-shaped clutch interface (123) and the inner annular clutch interface (124).

17. A centrifugal clutch device comprising:
an active rotary part (101) configured to be rotated by a power source;

a passive rotary part (201) configured to output rotational energy having an inner annular clutch interface (120), said inner annular clutch interface (120) configured to engage and release with a centrifugal force actuation clutch interface (119);

at least one C-shaped joint structure assembly (100) configured to be bent by displacement forces, said C-shaped joint structure assembly (100) comprising a radial arrangement installed between the active rotary part (101) and the passive rotary part (201) of the centrifugal clutch device, wherein said C-shaped joint structure assembly (100) is configured to be driven by the active rotary part, said C-shaped joint structure assembly (100) comprising a joint axial core (113) of the C-shaped joint structure configured to connect a first end of an active arm (111) of the C-shaped joint structure and a first end of a centrifugal compelling arm (112) of the C-shaped joint structure, and a pulling force recovery spring (115) disposed between the active arm (111) of the C-shaped joint structure and the centrifugal compelling arm (112) of the same C-shaped joint structure as the active arm (111) so that a prestressed inward bending force is formed between the active arm (111) and the centrifugal compelling arm (112), wherein a second end of the active arm (111) of the C-shaped joint structure is connected and fastened on the active rotary part (101), and a distal second end of the centrifugal compelling arm (112) of the C-shaped joint structure is coupled with the centrifugal force actuation clutch interface (119), and wherein said C-shaped joint structure is configured so that when a rotation speed of the active rotary part (101) reaches a preset engagement rotation speed, the centrifugal force actuation clutch interface (119) is outwardly expanded and moved so as to be engaged with the inner annular clutch interface (120) of the passive rotary part (201) so that the passive rotary part (201) outputs the rotational energy.

* * * * *